(12) United States Patent
Kim et al.

(10) Patent No.: US 9,761,856 B2
(45) Date of Patent: Sep. 12, 2017

(54) BATTERY PACK

(71) Applicant: SK Innovation Co., Ltd., Seoul (KR)

(72) Inventors: Sangyeon Kim, Yongin-si (KR); Yun Nyoung Lee, Gwangmyeong-si (KR)

(73) Assignee: SK Innovation Co., Ltd., Seoul (KR)

( * ) Notice: Subject to any disclaimer, the term of this patent is extended or adjusted under 35 U.S.C. 154(b) by 275 days.

(21) Appl. No.: 14/412,505

(22) PCT Filed: Jun. 14, 2013

(86) PCT No.: PCT/KR2013/005260
§ 371 (c)(1),
(2) Date: Jan. 2, 2015

(87) PCT Pub. No.: WO2014/007474
PCT Pub. Date: Jan. 9, 2014

(65) Prior Publication Data
US 2015/0171401 A1    Jun. 18, 2015

(30) Foreign Application Priority Data
Jul. 5, 2012  (KR) .................. 10-2012-0073232

(51) Int. Cl.
*H01M 2/30* (2006.01)
*H01M 2/20* (2006.01)
*H01M 2/10* (2006.01)

(52) U.S. Cl.
CPC .......... *H01M 2/204* (2013.01); *H01M 2/206* (2013.01); *H01M 2/1077* (2013.01); *H01M 2/305* (2013.01)

(58) Field of Classification Search
CPC ................. H01M 2/30; H01M 2/202
See application file for complete search history.

(56) References Cited

U.S. PATENT DOCUMENTS

| | | | |
|---|---|---|---|
| 4,306,004 A | 12/1981 | Kaun et al. | |
| 7,458,862 B2 | 12/2008 | Zhao et al. | |
| 2007/0026306 A1 | 2/2007 | Lee et al. | |
| 2007/0232154 A1 | 10/2007 | Zhao et al. | |
| 2009/0061305 A1* | 3/2009 | Nishida ............... | H01M 2/1072 429/164 |
| 2010/0255355 A1 | 10/2010 | Park et al. | |
| 2012/0082886 A1 | 4/2012 | Oya | |
| 2012/0121966 A1 | 5/2012 | Kim | |

FOREIGN PATENT DOCUMENTS

| | | |
|---|---|---|
| CN | 101378110 A | 3/2009 |
| JP | 2009059474 A | 3/2009 |
| JP | 201279456 A | 4/2012 |
| KR | 1020070014676 A | 2/2007 |
| KR | 1020070080871 A | 8/2007 |
| KR | 1020120061074 A | 6/2012 |
| WO | 2008038916 A1 | 4/2008 |

* cited by examiner

*Primary Examiner* — Olatunji Godo
(74) *Attorney, Agent, or Firm* — The Webb Law Firm

(57) ABSTRACT

Provided is a battery pack including flexible bus bars formed in a form in which a plurality of thin plates are stacked, having bent parts formed at the center thereof, and having both sides coupled to a positive electrode terminal and a negative electrode terminal protruding outwardly of battery modules to electrically connect electrode terminals of the battery modules to each other.

9 Claims, 10 Drawing Sheets

BATTERY PACK

CROSS-REFERENCE TO RELATED APPLICATIONS

This application is the United States national phase of International Application No. PCT/KR2013/005260 filed Jun. 14, 2013, and claims priority to Korean Patent Application No. 10-2012-0073232 filed Jul. 5, 2012, the disclosures of which are hereby incorporated in their entirety by reference.

TECHNICAL FIELD

The present invention relates to a battery pack including flexible bus bars capable of electrically connecting electrode terminals of a plurality of battery modules to each other.

BACKGROUND ART

Generally, since a secondary battery may be charged and discharged unlike a primary battery, the secondary battery has been applied to various fields such as a digital camera, a cellular phone, a laptop computer, and a hybrid vehicle and has been actively studied. An example of the secondary battery includes a nickel-cadmium battery, a nickel-metal hydride battery, a nickel-hydrogen battery, and a lithium secondary battery. In addition, among these secondary batteries, the lithium secondary battery having a high energy density and a discharging voltage has been mainly studied, and has been commercialized and widely used.

Further, the secondary battery is configured in a form of a battery module in which a plurality of battery cells are stacked due to the necessity of a high output and a large capacity, and is configured of one battery pack by stacking and arranging a plurality of battery modules in parallel with each other and connecting positive electrode terminals and negative electrode terminals of neighboring battery modules to each other by bus bars.

Here, the bus bar is formed of a hard metal plate and has through-holes formed at both sides thereof, and the positive electrode terminal and the negative electrode terminal protruding outwardly of the battery modules are inserted into the through-holes and are fastened and are closely adhered and coupled thereto by a nut, such that the positive electrode terminal and the negative electrode terminal are electrically connected to each other.

However, since the bus bar as described above has the through-holes formed at both sides thereof and the electrode terminals are inserted into the through-holes, it is difficult to assemble the electrode terminals so as to be inserted into the through-holes of the bus bar due to a dimension tolerance, an assembling tolerance, or the like, between neighboring battery modules and electrode terminals.

In addition, the battery pack configured of the plurality of battery modules is installed in a vehicle, or the like, and is exposed to vibrations. In this case, since both sides of the bus bar are fixed to the electrode terminals, the electrode terminals of the battery modules and the bus bar are vulnerable to the vibrations, damage occurs or a fastening means becomes loose, such that a contact defect occurs.

As the related art, U.S. Pat. No. 7,458,862 entitled "Canted Coil Spring Power Terminal and Sequence Connection System" has been disclosed.

RELATED ART DOCUMENT

Patent Document

U.S. Pat. No. 7,458,862 B2 (2008 Dec. 2)

DISCLOSURE

Technical Problem

An object of the present invention is to provide a battery pack including flexible bus bars capable of easily connecting electrode terminals of battery modules to each other and preventing damage and an electrical contact defect by absorbing vibrations applied to the electrode terminals and the flexible bus bars.

Technical Solution

In one general aspect, a battery pack includes: a plurality of battery modules stacked and arranged in parallel with each other and having electrode terminals formed at one sides thereof; flexible bus bars formed by stacking a plurality of thin plates, having bent parts formed at the center thereof, and having both sides connected to electrode terminals of neighboring battery modules; and fastening means coupled to the electrode terminals of the battery modules to electrically connect the flexible bus bars to the electrode terminals while fixing the flexible bus bars to the electrode terminals.

The fastening means may include: socket terminals having a plurality of elastic contactors extendedly formed at one sides of cylindrical bodies thereof so as to be spaced apart from each other by a predetermined interval in a circumferential direction and inserted onto and closely adhered to outer sides of the electrode terminals protruding from one sides of the battery modules; and sockets enclosing outer sides of the socket terminals and coupled to the socket terminals so as to be closely adhered thereto and having the flexible bus bars coupled to one sides thereof, and the electrode terminals and the flexible bus bars being electrically connected to each other by the socket terminals and the sockets.

The socket may have a vertical plate formed at one side of a cylindrical body thereof enclosing the outer side of the socket terminal and closely adhered to the outer side of the socket terminal, and the flexible bus bar may have both sides closely adhered and coupled to the vertical plate.

The battery pack may further include a case coupled to the battery modules to accommodate the sockets, the socket terminals, and the flexible bus bars coupled to the electrode terminals therein and closely adhering the sockets and the socket terminals to the electrode terminals in a direction in which the sockets and the socket terminals are inserted onto the electrode terminals.

Sliding guides and hooking jaws may be formed at both sides of partition walls formed in the battery modules, and sliding grooves corresponding to the sliding guides and elastic hooks hooked and fixed to the hooking jaws may be formed in the case.

The case may have fixing protrusions protruding at both sides of an inner portion thereof, and the flexible bus bar may have cut parts formed therein so as to correspond to the fixing protrusions, such that the flexible bus bar is closely adhered and fixed by the fixing protrusions.

Advantageous Effects

With the battery pack according to an exemplary embodiment of the present invention, the electrode terminals of the battery modules may be easily connected to each other, vibrations applied to the electrode terminals and the bus bar may be absorbed, thereby making it possible to prevent damage and an electrical contact defect.

[Detailed Description of Main Elements]

| | |
|---|---|
| 1000: battery pack | |
| 100: battery module | |
| 110: electrode terminal | 111: protruding end |
| 120: partition wall | 121: sliding guide |
| 122: hooking jaw | |
| 200: socket terminal | |
| 210: body | 211: coupling hole |
| 212: rotation preventing groove | |
| 220: elastic contactor | 221: bent part |
| 300: socket | |
| 310: body | 311: hooking protrusion |
| 312: jaw | 320: vertical plate |
| 500: case | |
| 510: case body | 511: sliding groove |
| 512: fixing protrusion | 513: seating part |
| 520: elastic hook | 521: elastic plate |
| 522: protrusion part | |
| 530: cover | 540: fixing ring |
| 600: flexible bus bar | |
| 610: through-hole | 611: bent part |
| 612: cut part | |

BEST MODE

A battery pack according to an exemplary embodiment of the present invention will be described in detail with reference to the accompanying drawings.

FIGS. 1 to 4 are an exploded perspective view, an assembled perspective view, and a cross-sectional view showing a battery pack according to an exemplary embodiment of the present invention.

As shown, a battery pack 1000 according to an exemplary embodiment of the present invention is configured to include a plurality of battery modules 100 stacked and arranged in parallel with each other and having electrode terminals 110 formed at one sides thereof; flexible bus bars 600 formed by stacking a plurality of thin plates, having bent parts 611 formed at the center thereof, and having both sides connected to electrode terminals 110 of neighboring battery modules 100; and fastening means coupled to the electrode terminals 110 of the battery modules 100 to electrically connect the flexible bus bars 600 to the electrode terminals 110 while fixing the flexible bus bars 600 to the electrode terminals 110.

Figure 1:
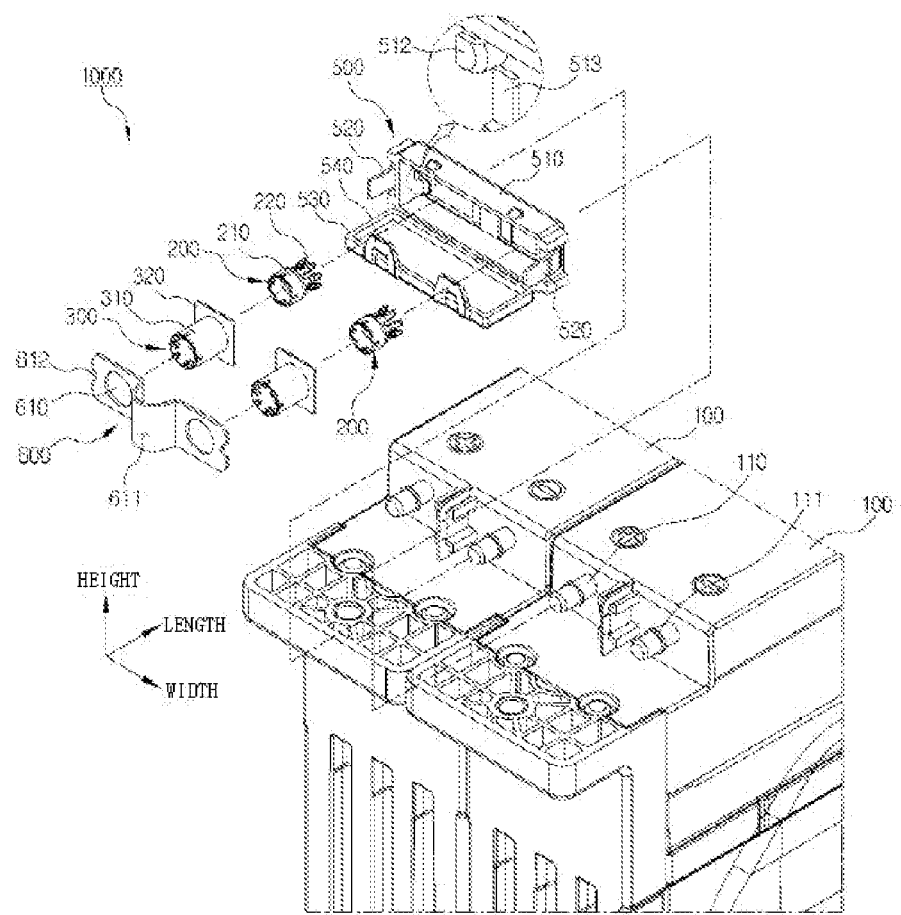
FIGS. 1 and 2 are a partially exploded perspective view and an assembled perspective view showing a battery pack according to an exemplary embodiment of the present invention.

First, the battery module 100 includes a plurality of battery cells electrically connected to each other and has the electrode terminals 110 protruding from one side thereof. Here, the electrode terminals 110 may include a positive electrode terminal and a negative electrode terminal spaced apart from each other by a predetermined distance and formed in parallel with each other as shown in FIG. 1, and may be formed at various positions such as a side surface of the battery module 100 in a length direction, an upper surface of the battery module 100, or the like. In addition, the plurality of battery modules 100 are stacked and arranged in parallel with each other in a width direction, and are arranged so that the electrode terminals 110 are positioned on a front surface thereof in the width direction. Therefore, the neighboring battery modules 100 are disposed so that a positive electrode terminal of one battery module and a negative electrode terminal of the other battery module are adjacent to each other.

In addition, the flexible bus bar 600 is formed in a form in which the plurality of thin plates are stacked, has the bent part 611 formed in a U shape at the center thereof, and has both sides connected to the electrode terminals 110 of the neighboring battery modules 100. Here, the flexible bus bar 600 may have through-holes 610 formed at both sides thereof, and be coupled to the battery modules 100 so that the positive electrode terminal and the negative electrode terminal of the battery modules 100 are inserted into the through-holes 610. In addition, since the flexible bus bar 600 is formed by stacking the plurality of thin plates and has the bent part 611 formed at the center thereof, even though the flexible bus bar 600 is formed of a metal having excellent conductivity, the flexible bus bar 600 may be flexible and have elasticity to increase or decrease a distance between the through-holes 610 into which the electrode terminals 110 are inserted and absorb vibrations.

Here, after the flexible bus bar 600 is coupled to the electrode terminals 110 of the battery modules 100, the fastening means may be coupled to the electrode terminals 110, and the flexible bus bar 600 is fixed and electrically connected to the electrode terminals 100 by the fastening means. Here, both sides of the flexible bus bar 600 may be coupled to the fastening means after the fastening means is coupled to the electrode terminals 110. As described above, the positive electrode terminal and the negative electrode terminal of the neighboring battery modules 100 may be electrically connected to each other by the fastening means and the flexible bus bar 600.

Therefore, in the battery pack according to an exemplary embodiment of the present invention, the electrode terminals of the battery modules may be easily connected to each other by the flexible bus bar even though a dimension tolerance and an assembling tolerance between the plurality of stacked and arranged battery modules are large, and the vibrations applied to the electrode terminals and the bus bar may be absorbed when the battery pack is configured of the battery modules, thereby making it possible to prevent damage and an electrical contact defect.

In addition, the fastening means includes socket terminals 200 having a plurality of elastic contactors 220 extendedly formed at one sides of cylindrical bodies 210 thereof so as to be spaced apart from each other by a predetermined interval in a circumferential direction and inserted onto and closely adhered to outer sides of the electrode terminals 110 protruding from one sides of the battery modules 100; and sockets 300 enclosing outer sides of the socket terminals 200 and coupled to the socket terminals 200 so as to be closely adhered thereto and having the flexible bus bars 600 coupled to one sides thereof, wherein the electrode terminals 110 and the flexible bus bars 600 may be electrically connected to each other by the socket terminals 200 and the sockets 300.

Here, the socket terminal 200 has the plurality of elastic contactors 220 formed at one side of the cylindrical body 210, wherein the elastic contactors 220 are formed so as to be spaced apart from each other by a predetermined distance in the circumferential direction of the body 210. The cylindrical body 210 has an inner diameter larger than an outer diameter of the electrode terminal 110, such that the socket terminal 200 may be easily inserted onto the outer side of the electrode terminal 110. In addition, the elastic contactors 220 are formed in a form in which they are bent toward a central axis of the cylindrical body 210, such that an inner diameter formed by the plurality of elastic contactors 220 is smaller than the outer diameter of the electrode terminal 110. Therefore, when the socket terminal 200 is inserted onto and coupled to the outer side of the electrode terminal 110, the elastic contactors 220 of the socket terminal 200 are closely adhered to the electrode terminal 110. In addition, the socket 300 may be inserted onto and be closely adhered and coupled to an outer side of the socket terminal 200, and be formed in a cylindrical shape so as to enclose the outer side of the socket terminal 200. Here, both sides of the flexible bus bar 600 are coupled to the sockets 300 by welding, or the like, such that the electrode terminals 110 and the flexible bus bar 600 may be electrically connected to each other by the socket terminals 200 and the sockets 300.

In a state in which the socket terminals 200 are inserted and coupled into the sockets 300 as described above, assemblies of the sockets 300 and the socket terminals 200 are inserted onto and are closely adhered and coupled to the outer sides of the electrode terminals 110, and the flexible bus bars 600 are inserted into and welded to outer sides of a pair of sockets 300, such that the positive electrode terminal and the negative electrode terminal of two battery modules 100 may be electrically connected to each other by the flexible bus bar 600.

In addition, since the flexible bus bar 600 may be fixed to the electrode terminals 110 in a press-fitting scheme using the fastening means including the socket terminals 200 and the sockets 300, the socket terminals 200 and the sockets 300 are coupled integrally with the flexible bus bar 600, thereby making it possible to couple the positive electrode terminal of one battery module 100 and the negative electrode terminal of the other battery module 100 to each other in a scheme of simultaneously press-fitting the flexible bus bar 600 onto the positive electrode terminal of one battery module 100 and the negative electrode terminal of the other battery module 100.

Therefore, since the fastening means may be coupled to the electrode terminals of the battery modules in the press-fitting scheme by the elastic contactors of the socket terminals inserted and coupled into the sockets, a separate tool for coupling the fastening means to the electrode terminals is not required, and the electrode terminals are simply connected to each other. In addition, the number of processes for connecting the electrode terminals and the flexible bus bar to each other and a time required for these processes may be decreased, and disassembling and assembling are simple, such that maintenance is easy. In addition, quality problems such as a problem that a nut becomes loose, a contact defect, and the like, due to insufficiency of a fastening torque that may occur in a nut fastening scheme may be solved.

Figure 4:
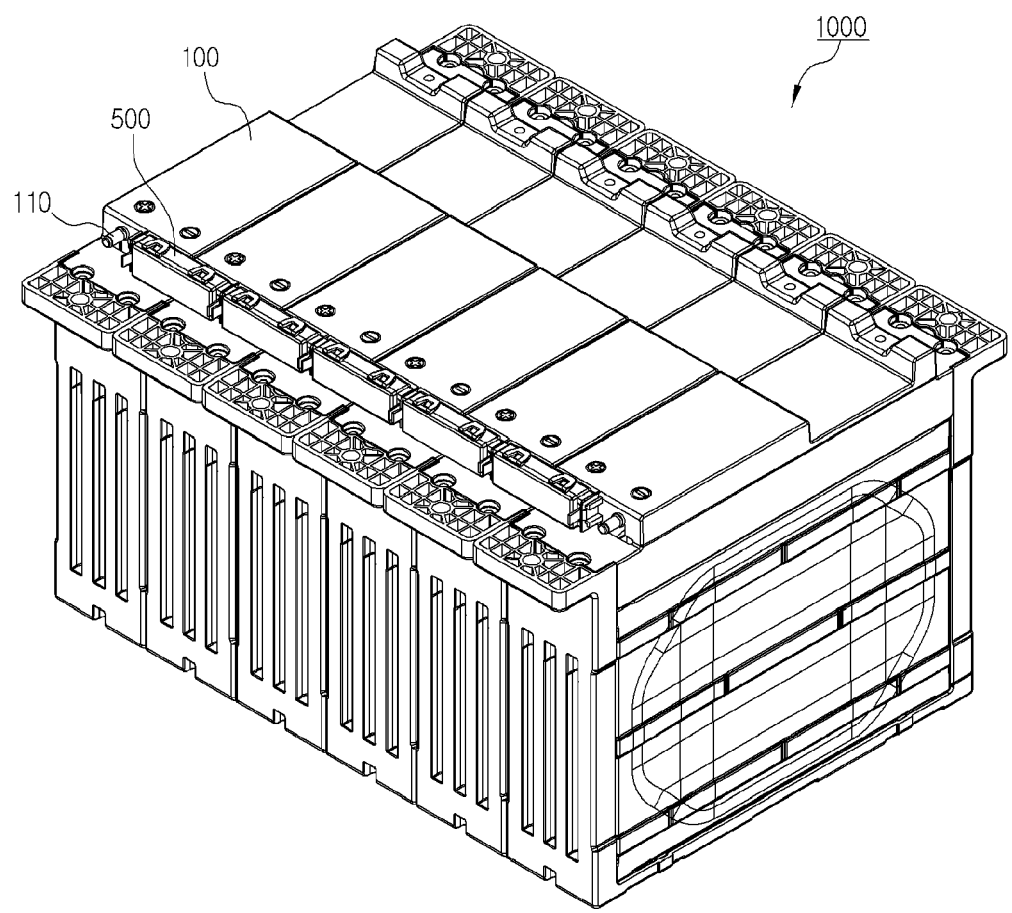
FIG. 4 is a perspective view showing the battery pack according to an exemplary embodiment of the present invention.
Figure 5:
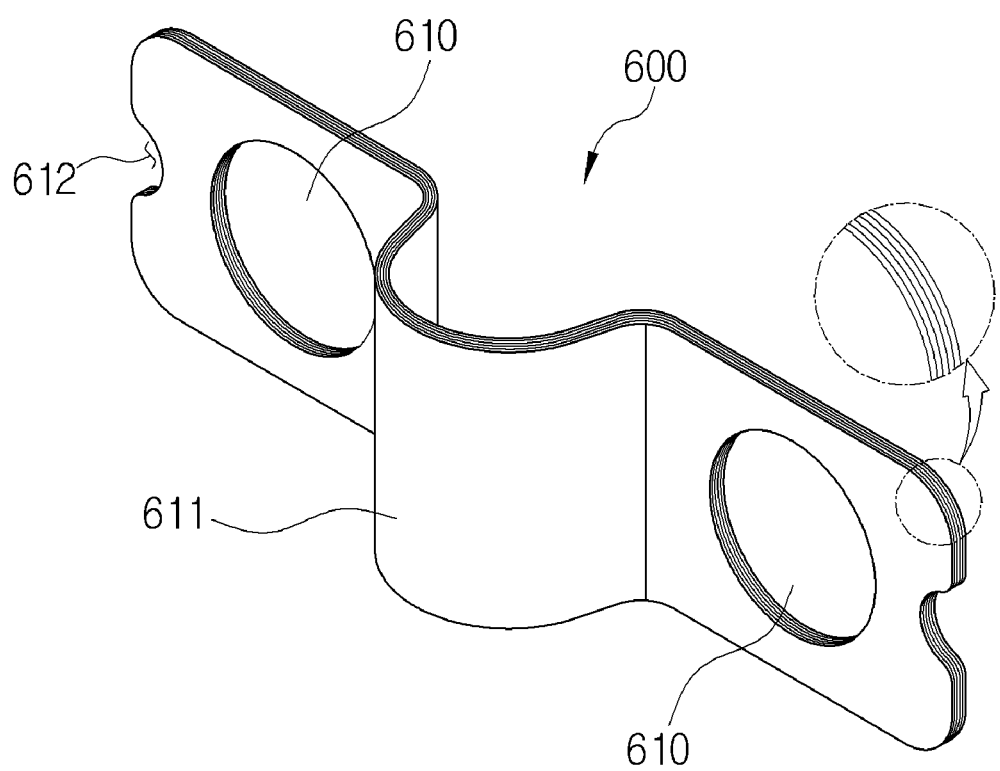
FIGS. 5 to 7 are an exploded perspective view and an assembled perspective view showing a coupled structure between a socket, a socket terminal, and a bus bar according to an exemplary embodiment of the present invention.

In addition, as shown in FIG. 4, the plurality of battery modules 100 may be stacked and the positive electrode terminals and the negative electrode terminals of the neighboring battery modules 100 may be connected to each other by the flexible bus bars 600 to form the battery pack 1000, and terminals connected to power cables of an external device may be coupled and connected to a positive electrode terminal and a negative electrode terminal of battery modules 100 disposed at the outermost portion using the socket terminals 200 and the sockets 300.

Figure 3:
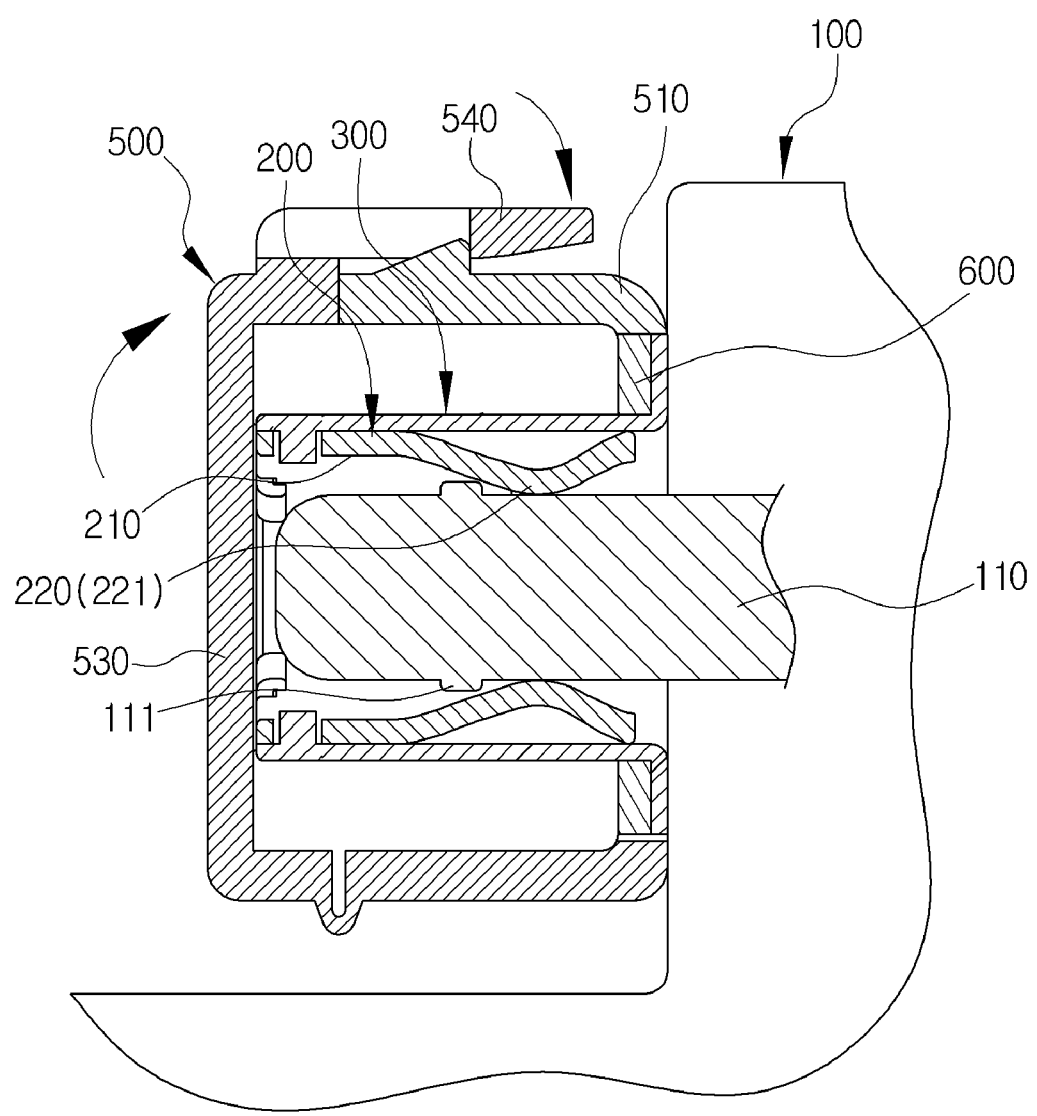
FIG. 3 is a cross-sectional view taken along line A-A' of FIG. 2.

In addition, the socket terminal 200 may have bent parts 221 formed by bending portions of the elastic contactors 220 in the length direction toward the center, as shown in FIG. 3, and the bent parts 221 of the elastic contactors 220 may be closely adhered to an outer peripheral surface of the electrode terminal 110. Therefore, when the socket terminals 200 are press-fitted onto the outer sides of the electrode terminals 110 in a state in which the socket terminals 200 are inserted and coupled into the sockets 300, the bodies 210 of the socket terminals 200 and the other sides (free ends) of the elastic contactors 220 of the socket terminals 200 are closely adhered to inner peripheral surfaces of the sockets 300, and the bent parts 221 are closely adhered to the outer peripheral surfaces of the electrode terminals 110, such that electrical connection may be stabilized. Here, the electrode terminal 110 has a protruding end 111 formed on the outer peripheral surface thereof, and the socket terminal 200 may be inserted onto and coupled to the electrode terminal 110 so that the bent parts 221 of the elastic contactor 220 are caught by the protruding end 111. Therefore, the socket terminal 200 may not be easily withdrawn in an opposite direction to a direction in which it is inserted.

Figure 6:
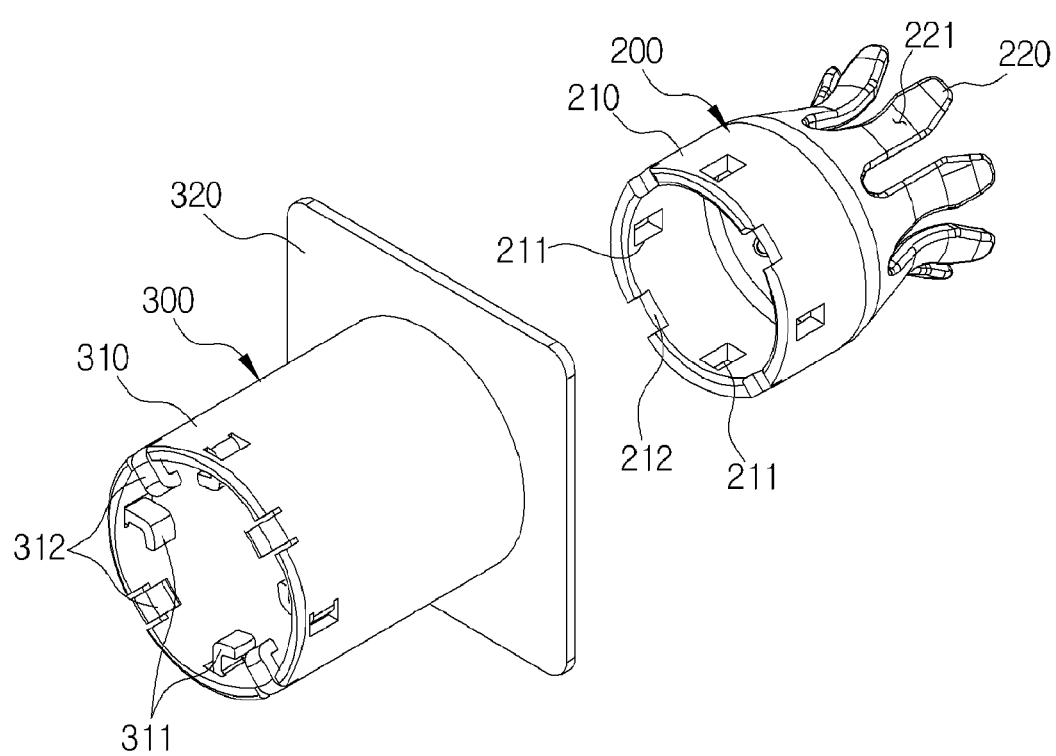
Figure 7:
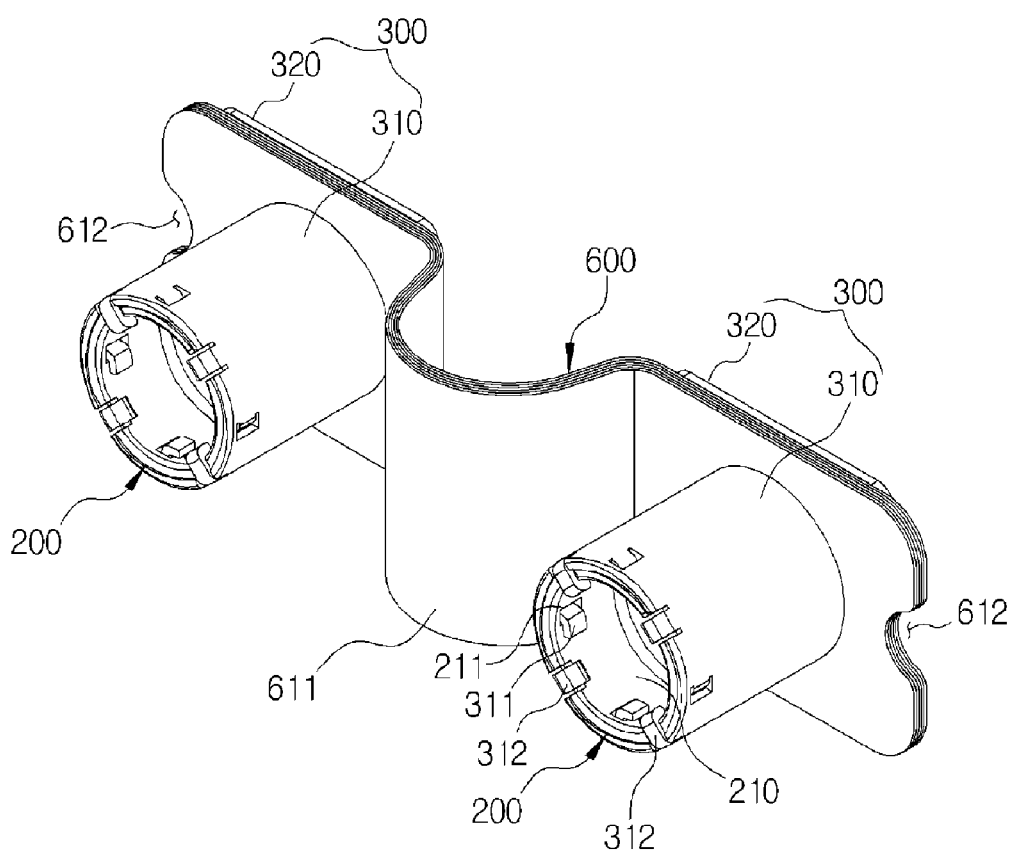

In addition, as shown in FIGS. 6 and 7, the socket 300 has hooking protrusions 311 protruding on the inner peripheral surface thereof, and the socket terminal 200 has a plurality of coupling holes 211 formed in the body 210 thereof, wherein the hooking protrusions 311 may be inserted into and fixed to the coupling holes 211.

In addition, the socket 300 may have jaws 312 formed on the inner peripheral surface thereof at an opposite side to a side at which it is inserted onto the electrode terminal 110. Here, the jaw 312 has an inner diameter smaller than an outer diameter of the body 210 of the socket terminal 200, such that the socket terminal 200 may be press-fitted onto the outer side of the electrode terminal 110 without being pushed out in an opposite direction to a direction in which it is inserted.

In addition, the socket terminal 200 may have rotation preventing grooves 212 formed at one side of the body 210 thereof, wherein the rotation preventing grooves 212 have the jaws 312 inserted and seated thereinto.

In addition, the socket 300 may have a vertical plate 320 formed at one side of a cylindrical body 310 thereof enclosing the outer side of the socket terminal 200 and closely adhered to the outer side of the socket terminal 200, and the flexible bus bar 600 may be closely adhered and coupled to the vertical plate 320. That is, when the vertical plate 320 is formed at one side of the cylindrical body 310 of the socket 300, the flexible bus bar 600 may be closely adhered and then welded to the vertical plate 320, such that coupling and electrical connection may be facilitated.

Figure 2:
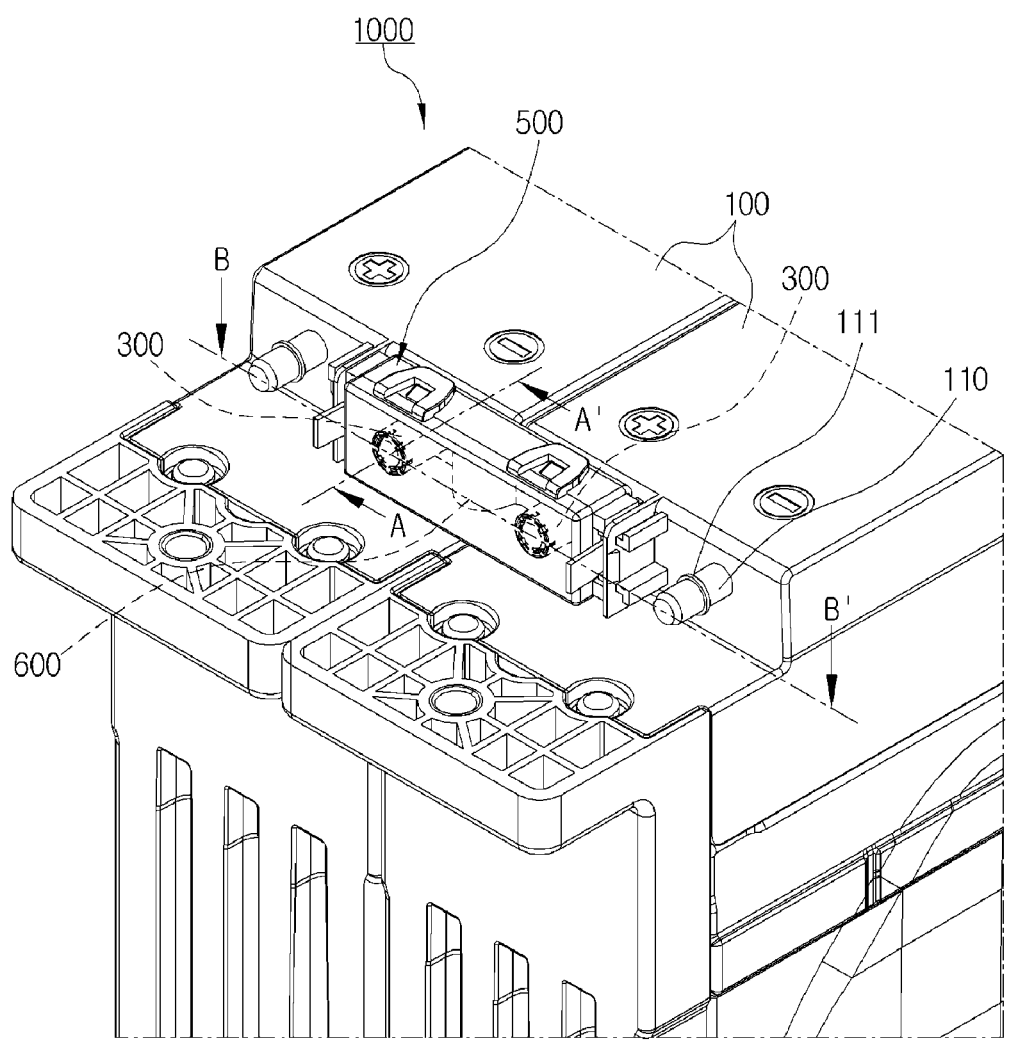

In addition, the battery pack 1000 according to an exemplary embodiment of the present invention may further include a case 500 coupled to the battery modules 100 to accommodate the socket terminals 200, the sockets 300, and the flexible bus bars 600 coupled to the electrode terminals 110 therein and closely adhering the socket terminals 200 and the sockets 300 to the electrode terminals 110 in the direction in which the socket terminals 200 and the sockets 300 are inserted onto the electrode terminals 110. That is, the case 500 may be fixed to the battery modules 100, as shown in FIG. 2, to protect the electrode terminals 110, the socket terminals 200, the sockets 300, and the flexible bus bars 600, and a cover 530 of the case 500 may closely adhere the socket terminals 200 and the sockets 300 to the electrode terminals 110 in the direction in which the socket terminals 200 and the sockets 300 are inserted onto the electrode terminals 110, as shown in FIG. 3, to prevent the socket terminals 200 and the sockets 300 from being separated from the electrode terminals 110. Here, the case 500 includes the cover 530 hinge-coupled to opened one side of a case body 510 of which both sides are opened and a fixing ring 540 hinge-coupled to the cover 530, wherein the cover 530 is closed and the fixing ring 540 is locked and fixed to fixing protrusions formed on a case body 510.

Figure 8:
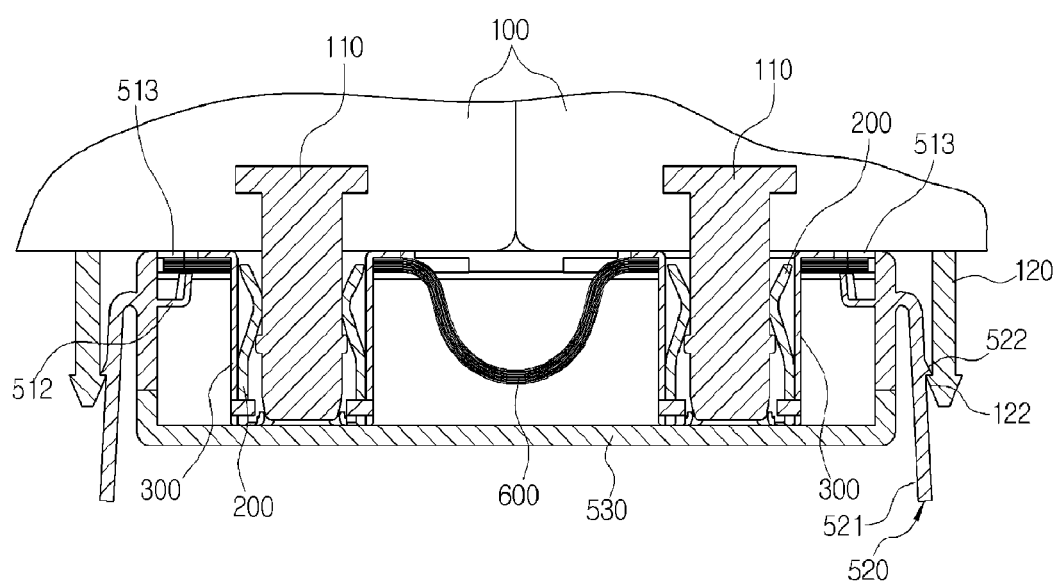
FIG. 8 is a cross-sectional view taken along line B-B' of FIG. 2.
Figure 9:
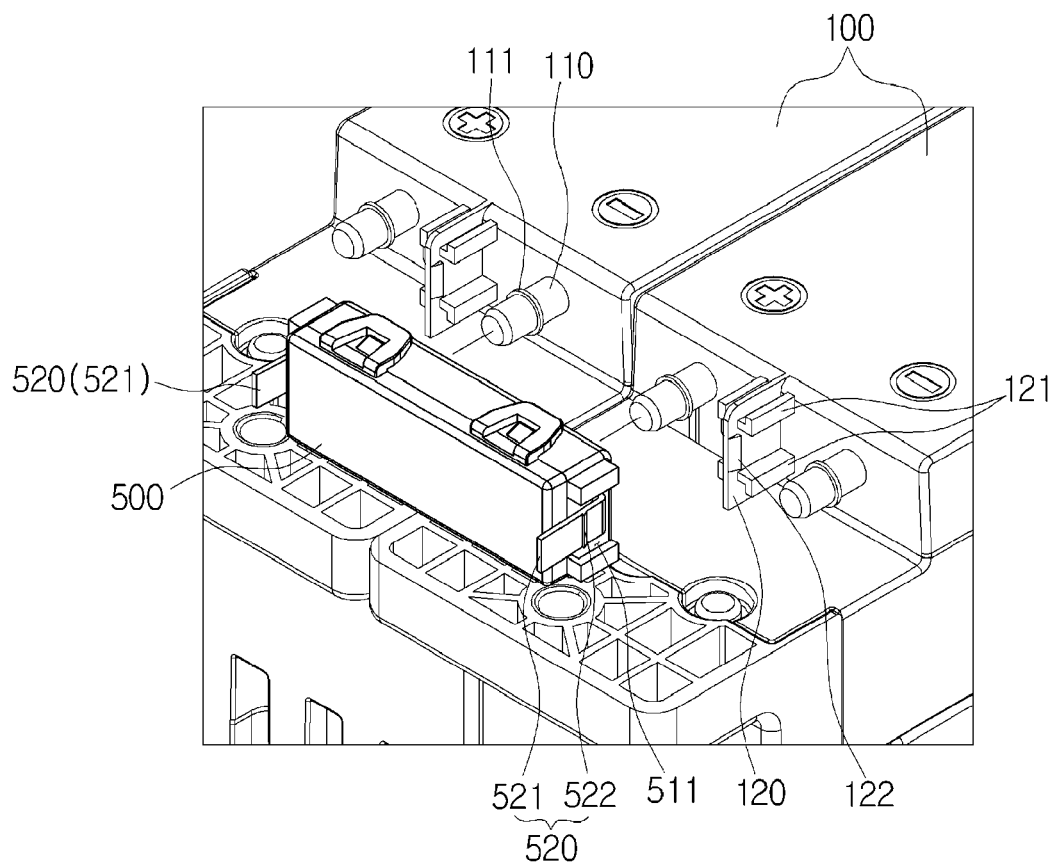
FIGS. 9 and 10 are an exploded perspective view and an assembled perspective view showing a coupled structure between a battery module and a case according to an exemplary embodiment of the present invention.
Figure 10:
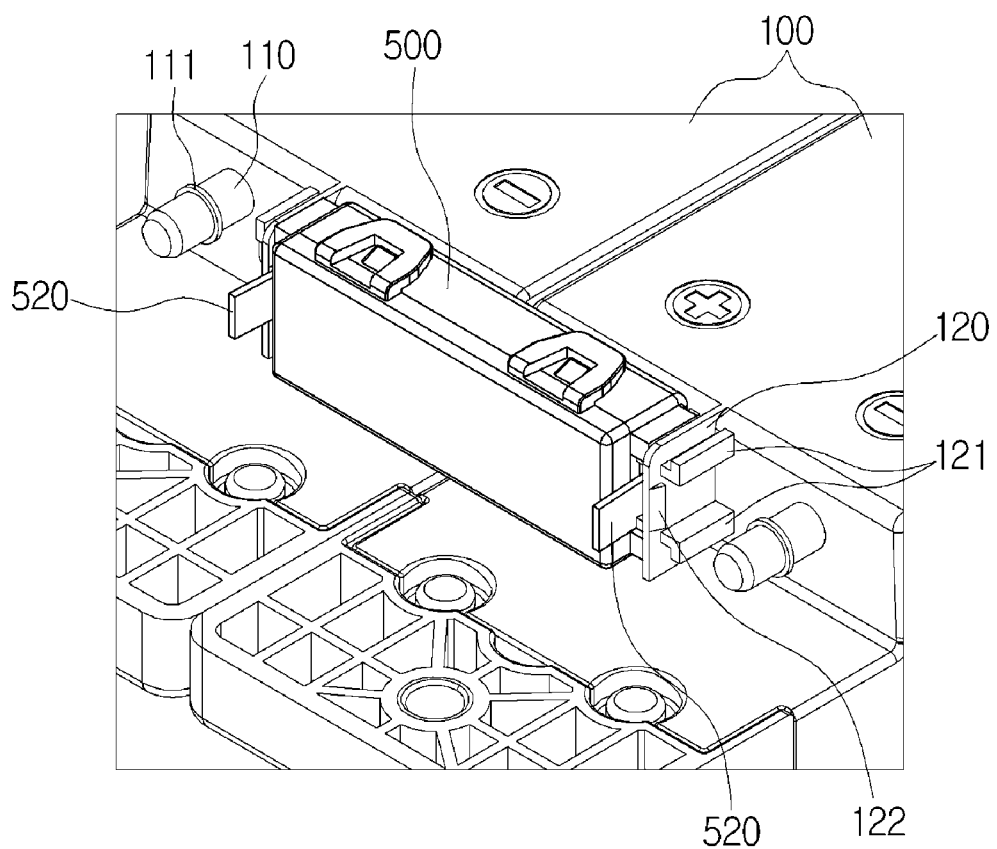

In addition, sliding guides 121 and hooking jaws 122 may be formed at both sides of partition walls 120 formed in the battery modules 100, and sliding grooves 511 corresponding to the sliding guides 121 and elastic hooks 520 hooked and fixed to the hooking jaws 122 may be formed in the case 500. That is, as shown in FIGS. 8 to 10, in a state in which the sliding guides 121 are inserted along the sliding grooves 511 formed at both side surfaces of the case body 510, such that one side of the case body 510 is closely adhered to the battery modules 100, the case body 510 is fixed by the elastic hooks 520 and the hooking jaws 122, such that it is not withdrawn backward. Here, the partition wall 120 of the battery module 100 may be formed between a pair of electrode terminals 110 spaced apart from each other by a predetermined distance, and the sliding guides 121 formed at both sides of the partition wall 120 may be formed in pairs at upper and lower portions so as to be symmetrical to each other and prevent separation of the case body 510. In addition, the partition wall 120 may have the hooking jaw 122 formed between the pair of sliding guides 121 so that the elastic hook 520 is hooked thereto. Further, one side of an elastic plate 521 of the elastic hook 520 is fixed to the case 500 and the other side thereof is extended in an opposite direction to a direction in which the case 500 is coupled to the battery module 100 to thereby be longer than the case 500 and the partition wall 120, and the elastic plate 521 has a protrusion part 522 formed thereon to thereby be hooked and fixed to the hooking jaw 122 of the partition wall 120. This is to easily disassemble the case 500, one side of the elastic plate 521 is coupled to a side surface of the case body 510, that is, a side close to the battery module 100, and the other side of the elastic plate 521 is lengthily extended to an opposite side so as to be longer than the case 500 in the length direction, and the protrusion part 522 is formed on the elastic plate 521.

In addition, the case 500 has fixing protrusions 512 protruding at both sides of an inner portion thereof, and the flexible bus bar 600 has cut parts 612 formed therein so as to correspond to the fixing protrusions 512, such that the flexible bus bar 600 is closely adhered and fixed by the fixing protrusions 512.

That is, when the socket terminals 200, the sockets 300, and the flexible bus bars 600 are coupled to each other and are then inserted into the outer sides of the electrode terminals 110 in a state in which the case 500 is coupled to the battery modules 100, as shown in FIG. 8, the flexible bus bars 600 are closely adhered to the battery modules 100 by the fixing protrusions 512 after the cut parts 612 of the flexible bus bars 600 are press-fitted while being slid along the fixing protrusions 512. Therefore, it is possible to prevent the flexible bus bars 600, the sockets 300, and the socket terminals 200 from being separated in an opposite direction to a direction in which the flexible bus bars 600, the sockets 300, and the socket terminals 200 are inserted onto the electrode terminals 110, by the fixing protrusions 512 formed at both sides of the inner portion of the case 500. Here, the fixing protrusion 512 may be formed in a 'ㄱ' shape on an inner side wall of the case 500, and an outer side of a bent portion of the fixing protrusion 512 may be formed in an inclined shape or a round shape so that the cut part 612 of the flexible bus bar 600 is easily slid when being press-fitted.

In addition, the case 500 has seating parts 513 formed at opened one side thereof so that both sides of the flexible bus bar 600 are seated and has the fixing protrusions 512 protruding at both sides of an inner portion of an accommodating part thereof, such that the flexible bus bar 600 may be closely adhered and fixed to the seating parts 513 by the fixing protrusions 512. Therefore, after a pair of socket terminals 200, a pair of sockets 300, and the flexible bus bar 600 are fixed in a state in which they are coupled to each other in the case 500, the cover 530 of the case 500 is closed, and the case 500 is closely adhered to the battery modules 100, thereby making it possible to connect the electrode terminals 110 to each other.

The present invention is not limited to the above-mentioned exemplary embodiments but may be variously applied, and may be variously modified by those skilled in the art to which the present invention pertains without departing from the gist of the present invention claimed in the claims.

The invention claimed is:

1. A battery pack comprising:
   a plurality of battery modules stacked and arranged in parallel with each other and having electrode terminals formed at one side thereof;
   each of flexible bus bars formed by stacking a plurality of thin plates, having bent parts formed at the center of the plurality of thin plates, and having both sides connected to electrode terminals of neighboring battery modules; and
   fastening means coupled to the electrode terminals of the battery modules to electrically connect the flexible bus bars to the electrode terminals while fixing the flexible bus bars to the electrode terminals.

2. The battery pack of claim 1, wherein the fastening means includes:
   socket terminals having a plurality of elastic contactors extendedly formed at one sides of cylindrical bodies thereof so as to be spaced apart from each other by a predetermined interval in a circumferential direction and inserted onto and closely adhered to outer sides of the electrode terminals protruding from one sides of the battery modules; and
   sockets enclosing outer sides of the socket terminals and coupled to the socket terminals so as to be closely adhered thereto and having the flexible bus bars coupled to one sides thereof,
   the electrode terminals and the flexible bus bars being electrically connected to each other by the socket terminals and the sockets.

3. The battery pack of claim 2, wherein the socket has a vertical plate formed at one side of a cylindrical body thereof enclosing the outer side of the socket terminal and closely adhered to the outer side of the socket terminal, and the flexible bus bar has both sides closely adhered and coupled to the vertical plate.

4. The battery pack of claim 2, further comprising a case coupled to the battery modules to accommodate the sockets, the socket terminals, and the flexible bus bars coupled to the electrode terminals therein and closely adhering the sockets and the socket terminals to the electrode terminals in a direction in which the sockets and the socket terminals are inserted onto the electrode terminals.

5. The battery pack of claim 4, wherein sliding guides and hooking jaws are formed at both sides of partition walls formed in the battery modules, and sliding grooves corresponding to the sliding guides and elastic hooks hooked and fixed to the hooking jaws are formed in the case.

6. The battery pack of claim 4, wherein the case has fixing protrusions protruding at both sides of an inner portion thereof, and the flexible bus bar has cut parts formed therein so as to correspond to the fixing protrusions, such that the flexible bus bar is closely adhered and fixed by the fixing protrusions.

7. The battery pack of claim 3, further comprising a case coupled to the battery modules to accommodate the sockets, the socket terminals, and the flexible bus bars coupled to the electrode terminals therein and closely adhering the sockets and the socket terminals to the electrode terminals in a direction in which the sockets and the socket terminals are inserted onto the electrode terminals.

8. The battery pack of claim 7, wherein sliding guides and hooking jaws are formed at both sides of partition walls formed in the battery modules, and sliding grooves corresponding to the sliding guides and elastic hooks hooked and fixed to the hooking jaws are formed in the case.

9. The battery pack of claim 7, wherein the case has fixing protrusions protruding at both sides of an inner portion thereof, and the flexible bus bar has cut parts formed therein so as to correspond to the fixing protrusions, such that the flexible bus bar is closely adhered and fixed by the fixing protrusions.

* * * * *